May 12, 1959 R. F. STEWART 2,886,026

METHOD OF AND APPARATUS FOR CUTTING A SEMICONDUCTOR CRYSTAL

Filed Aug. 20, 1957

INVENTOR

Richard F. Stewart

BY Stevens, Davis, Miller & Mosher

ATTORNEYS

United States Patent Office 2,886,026

Patented May 12, 1959

2,886,026

METHOD OF AND APPARATUS FOR CUTTING A SEMICONDUCTOR CRYSTAL

Richard F. Stewart, Dallas, Tex., assignor to Texas Instruments Incorporated, Dallas, Tex., a corporation of Delaware Application August 20, 1957, Serial No. 679,220

6 Claims. (Cl. 125—12)

The present invention relates to a method of and apparatus for cutting semiconductor crystals and in particular to apparatus which uses a self compensating method for cutting semiconductor crystals having an n-p junction to a desired shape.

In the manufacture of grown junction semiconductor crystals, a curved or non-linear n-p junction is frequently formed. At the present, cutting of crystals preparatory to dicing has been accomplished using diamond studded circular saws. Use of such cutting tools results in a straight line cut. Such cutting methods are entirely unsatisfactory for use on a crystal characterized by a curved or non-linear junction since the path of the cut will not be equidistant at all points from the junction. In these methods, the direction of the cutter is fixed and can not be corrected, by hand or otherwise, to compensate for the curvature of the junction. It is thus apparent that a great need exists for a method of performing this cutting operation in a way to overcome the drawbacks inherent in the use of presently known techniques. It is to satisfy this need that the present invention has been conceived.

This is accomplished by the present invention by providing a method and apparatus for slicing a grown junction semiconductor crystal along a path that parallels the junction regardless of whether it is curved or not. The junction may be curved with respect to a vertical axis as well as with respect to a horizontal axis. However, by using specimens that are sufficiently thin, we need concern ourselves only with curvature in a horizontal plane.

The invention is carried out by making a resistivity measurement on the surface of the crystal. Due to the reflecting nature or property of the junction, the resistivity measurement will produce a signal mathematically related to the distance the resistivity measuring device is from the junction. By suitable calibration, the signal produced by the measuring device is fed to a servo follow-up system that controls or guides a cutting tool across the face of the crystal along a path that parallels the junction. In this regard, the measuring device and cutting tool are mounted in fixed spaced relation.

Accordingly, it is an object of the present invention to provide a method of and apparatus for cutting a grown junction semiconductor crystal automatically wherein a property of the crystal itself is used to guide a cutting tool with reference to the junction.

A more particular object is to provide a method of and apparatus for cutting a grown junction semiconductor crystal which uses the reflected voltage from a junction derived by means of a resistivity measuring device to guide the device and a cutting tool as they traverse the face of the crystal.

Another object of the present invention is to provide a method for maintaining a cutting tool, in the course of its operation, at a fixed distance from a junction of a semiconductor crystal.

A further object of the present invention is to provide a self-compensating method of control to allow more accurate and reproducible cutting for semiconductor crystals which have at least one junction present.

An additional object of the present invention is to provide a method for cutting a crystal according to a desired contour, thus obviating the need for individual attention and resulting in large economy gains.

Other objects and advantages of the present invention will become readily apparent upon a detailed consideration of the following description when taken in conjunction with the drawings in which.

Figure 1:
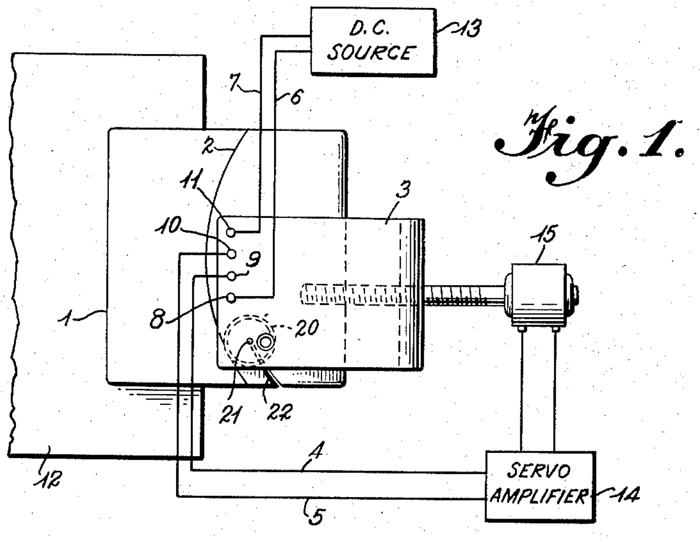
Figure 1 is a schematic diagram showing a top view of the crystal cutting operation.

Referring now to Figure 1, a grown crystal is indicated generally at 1 having a curved n-p junction 2. The crystal is shown suitably held for a cutting operation by a plate 12. The latter is capable of being driven laterally normal to the general line of movement of a cutting tool 21 by any suitable means (not shown).

A four-probe resistivity device having probes 8, 9, 10 and 11 is arranged on the upper surface of the crystal with the probes in a straight line.

Figure 2:
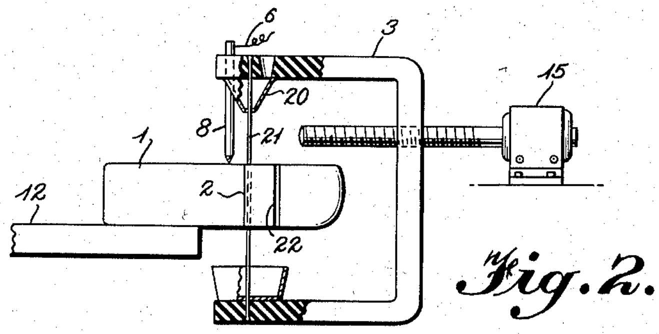
Figure 2 is a side view in diagrammatic form of the cutting operation.

Cutting tool 21 is a wire over which flows an electrolyte from container 20. (Fig. 2.) The result is an electrolytic etch cutting technique. This is shown by way of example only since any suitable cutting tool such as a small saw blade or small cavitron tool may be used satisfactorily in place of the electrolytic etch cutting.

A suitable housing 3 is provided to hold cutting tool 21 and probes 8, 9, 10 and 11 in fixed space relation. It is not necessary that a cutting tool 21 and probes 8, 9, 10 and 11 be held in the same housing but only that a fixed space relation be maintained between them so that a correction movement derived from an error voltage, to be explained hereinafter, will move the cutting tool 21 and probes 8, 9, 10 and 11 an equal distance. It is merely a matter of convenience to use a single housing for both the probes and the cutter.

It is desirable for the housing material used to have good machining properties, a high resistance, and a low coefficient of friction. One material possessing these qualities is manufactured by the du Pont Company of Wilmington, Delaware under the trade name "Teflon" (a polytetrafluoroethylene resin).

In the use of a four-probe resistivity method, a direct current source, shown at 13, applies a current to outer probes 8 and 11 through leads 6 and 7 respectively. A voltage drop is measured between inner probes 9 and 10. The surface of crystal 1 should be flat and smooth. The current applied to probes 8 and 11 should be small so that there is no significant rise in temperature of the crystal 1 in the region in which measurement is made, since this will introduce carriers and thereby change the measured value of resistivity. For a more detailed explanation of the four-probe method and the circuits involved, reference is made to Handbook of Semiconductor Electronics edited by Lloyd P. Hunter, pp. 20–3 to 20–8, published by McGraw-Hill Book Company, 1956.

When the resistivity measuring device is in the vicinity of a p-n junction, the voltage drop will be dependent upon the reflecting characteristics of the junction and the distance of the probes from the junction. The voltage from probes 9 and 10 is conveyed to a servo amplifier 14 through leads 4 and 5 where it is amplified. The output of the servo amplifier 14 is proportional to the correction desired. This output is applied to a reversibly operable motor 15 which, through a suitable drive (lead screw), adjusts the position of housing 3 to compensate for the error voltage detected and restores the housing 3 and probes to the proper preselected distance from the p-n junction.

As the plate 12 moves crystal 1 beneath and in contact with the ends of the probes 8, 9, 10 and 11, the probes are moved across the face of the crystal parallel to the lateral axis of the crystal. If the crystal has a curved junction as depicted in Figure 1, a decrease in voltage will be detected since the probe to junction distance will be increasing. Any change in voltage will be amplified by a servo amplifier 14. The output therefrom is applied to motor 15, which in this instance is used to drive housing 3 to the left in Figure 1 toward the junction, thereby compensating for the error voltage obtained. Later, when the uncompensated relative motion between the plate 12 and housing 3 causes a decrease in the junction to probe distance, an increased voltage is detected because of a greater reflection from junction 2. This increased voltage is amplified by servo amplifier 14, as described above, but in this case the change in voltage is used to drive the probes 8, 9, 10 and 11 and cutting wire 21 away from the junction. It is not necessary that the cutting wire be the same distance from the junction as the probes. Thus, in the embodiment shown, the probes are closer to the junction than the cutting wire is.

Figure 3:
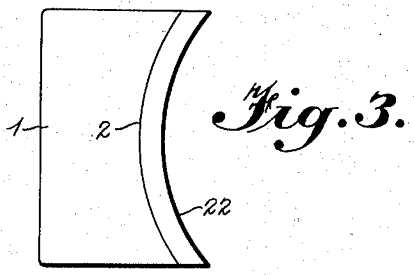
Figure 3 shows a crystal after the cutting operation.

Figure 3 shows how line 22 along which the cutting operation is performed parallels junction 2 in the finished crystal.

A number of changes and modifications are possible in addition to those already indicated. For example, if a flat wafer or crystal slice is being used, a simplified two-probe method may be used in which the two probes detect the error voltage.

The probe ends in addition to being provided with non-rectifying contacts may be made of tungsten or hard steel.

Other modifications of the present invention are possible with respect to the manner in which motion is imparted to the various elements. For example, it is possible to apply the corrections to the plate 12 and to drive the housing 3 normal to the line in which corrections are made. Alternatively, all motions may be imparted to either the plate 12 or to the housing 3. Thus it is seen that four combinations are possible.

Though the present invention has been shown as described in specific embodiments, various changes and modifications obvious to one skilled in the art are within the scope, purpose and intent of this invention.

What is claimed is:

1. A method of cutting a junction type semiconductor crystal comprising cutting the crystal along a line spaced from the line of the crystal junction, measuring the resistivity of said crystal in the vicinity of the line of cut as it progresses by detecting a voltage drop between two spaced points on the crystal, and maintaining the line of cut substantially parallel to the crystal junction by utilizing the detected voltage drop as an error signal.

2. Apparatus for cutting a crystal having at least one p-n junction which comprises means for detecting the resistivity of said crystal, means for causing relative motion between said crystal and said resistivity detecting means and means for cutting said crystal in accordance with voltages detected by said means for detecting resistivity.

3. Apparatus for cutting a crystal having at least one n-p junction which comprises means for supporting said crystal, means to detect the resistivity of said crystal, means for causing relative motion between said means for supporting said crystal and said means to detect resistivity, and means for cutting said crystal in accordance with voltages detected by said means to detect resistivity.

4. Apparatus for cutting a crystal which comprises a crystal having at least one n-p junction, means for supporting said crystal, means for cutting said crystal, means to measure changes in reflected voltage from said junction due to changes in position of said measuring means from said junction, means for moving said crystal cutting means and said resistivity measuring means in unison across the face of said crystal and means for controlling said crystal cutting means in accordance with said measured changes in voltage.

5. Apparatus for cutting a crystal which comprises a crystal having at least one n-p junction, means for supporting said crystal, means for cutting said crystal, means to detect an error voltage due to changes in position of said detecting means from said junction, means for causing relative motion between said crystal and said detecting means, means for amplifying said error voltage and means for controlling said crystal cutting means in accordance with said amplified error voltage.

6. A method of crystal fabrication comprising cutting the crystal along a line spaced from a line in the crystal whereat an abrupt resistivity change takes place, measuring the resistivity of said crystal in the vicinity of the line of cut as it progresses by detecting a voltage drop between two spaced points on the crystal, and maintaining the line of cut substantially parallel to the line of resistivity change by utilizing the detected voltage drop as an error signal.

No references cited.